April 15, 1924.                                                    1,490,865
                         F. B. VAN DE VELDE
                           ROOT FERTILIZER
                          Filed Aug. 8, 1922

WITNESSES

INVENTOR
Frank B. Van de Velde
BY
ATTORNEYS

Patented Apr. 15, 1924.

1,490,865

UNITED STATES PATENT OFFICE.

FRANK B. VAN DE VELDE, OF GREEN BAY, WISCONSIN.

ROOT FERTILIZER.

Application filed August 8, 1922. Serial No. 580,472.

*To all whom it may concern:*

Be it known that I, FRANK B. VAN DE VELDE, a citizen of the United States, and a resident of Green Bay, in the county of Brown and State of Wisconsin, have invented new and useful Improvements in Root Fertilizers, of which the following is a full, clear, and exact description.

This invention relates to root fertilizers.

The general object of this invention is the provision of a simple and efficient device for positioning in the ground, through which nourishment may be conveyed to plant life.

A further object of the invention is the provision of a device for conveying nourishment to the roots of plant life provided with means for removing used fertilizer to allow of the introduction of fresh fertilizer.

These objects are accomplished by the provision of a perforated tube, removably mounting in said perforated tube an adjustable bottom for supporting the fertilizer, said bottom being provided with means for removing it from the tube, and mounting on the tube a cap provided with a covered opening through which a hose may be inserted.

These and other objects of the invention will be more clearly understood from the following detailed description and accompanying drawings.

Figure 1:
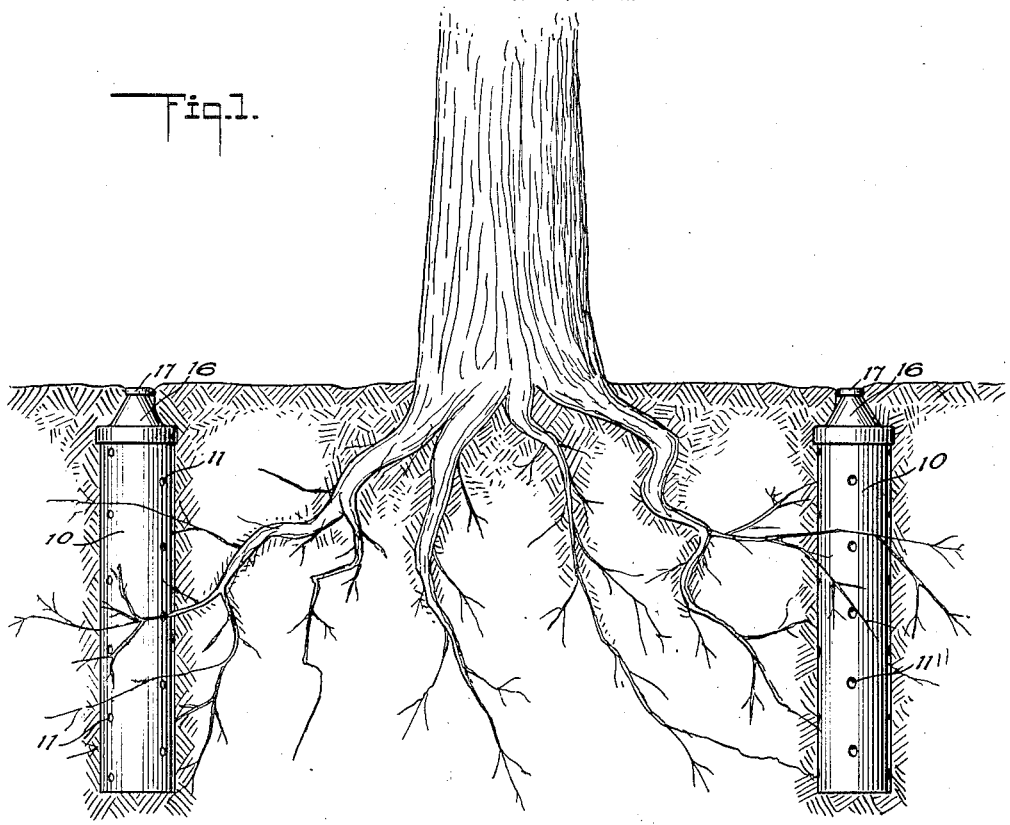
Figure 1 is a side elevation showing root fertilizers positioned in the ground in the vicinity of the roots of a tree.

Referring to the above mentioned drawings, a tube 10, open at both ends, is provided with a plurality of perforations 11 which slope downward toward the outside surface of the tube. These perforations are of greater area at the outside surface of the tube than at the inside surface. Removably mounted in the fertilizer is a bottom 12, to which a cone-shaped standard 13 is attached. Formed on the upper end of the cone-shaped standard 13 is an eye 14 with which any hook or the like may be engaged for removing the bottom from the tube. The bottom 12 supports the fertilizer 15 at any level in the tube 10.

A cover 16, having an opening 18 in its upper end which is closed by means of a cap 17 hinged to the body of the cover, is mounted on the upper end of the tube 10. This coved 16 is removably mounted on the tube so that it may be conveniently removed when it is desired to remove the bottom 12.

Figure 2:
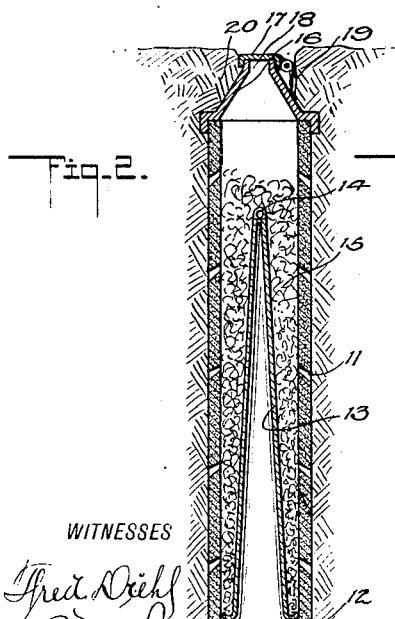
Figure 2 is a vertical section through the root fertilizer.

When a device of this type is used for conveying nourishment to roots of plant life, particularly trees, it is buried in the ground near the ends of the tree roots. As shown in Figure 1, the device is positioned in the gronund so that the upper end of the cover 16 is just slightly below the surface of the ground. After the tube 10 has been placed in position the bottom 12 is projected down into the tube, as shown in Figure 2. If it is desired to prevent the fertilizer 15 from saturating the soil below the tube then a certain amount of soil is packed in on the bottom 12 before the tube is filled with fertilizer. After the tube has been filled with fertilizer, the cover 16 is placed in position and sods 19 and 20 are positioned about it serving to protect it.

Figure 3:
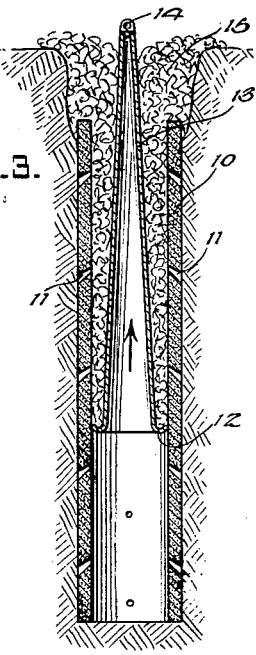
Figure 3 is a vertical section through the root fertilizer showing the bottom partly drawn up the tube, removing the used fertilizer.
Figure 4:
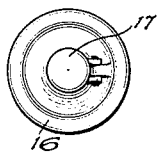
Figure 4 is a top plan view of the root fertilizer.

The nourishment from the fertilizer finds its way through the perforations 11 into the soil and is absorbed by the roots of the trees. In order to more rapidly convey the nourishment from the fertilizer to the trees the device may be filled with water. The water may be introduced through the opening 18. After the fertilizer has lost its strength it may be removed by removing the cover 16 and drawing the bottom 12 upward, forcing the fertilizer out over the top of the ground, as shown in Figure 3.

I would state in conclusion that while the illustrated example constitutes a practical embodiment of my invention, I do not limit myself strictly to the exact details herein illustrated since manifestly the same can be considerably varied without departing from the spirit of the invention as defined in the appended claims.

Claims:

1. In a device of the character described, an elongated receptacle adapted to retain a liquid and also adapted to be imbedded in the earth, said receptacle having its walls provided with orifices extending at an angle to the longitudinal axis of the receptacle, and each orifice increasing in diameter toward its outer end, for the purpose described.

2. A device of the character described, comprising a perforated cylindrical member and an elongated conical member insertible in said cylindrical member and having its base formed with a flange adapted to form a tight fit with the interior surface of said perforated cylindrical member.

3. A device of the character described comprising a perforated cylindrical member and an elongated conical member insertible in said cylindrical member and having its base formed with a flange adapted to form a tight fit with the interior surface of said perforated cylindrical member, and an eye formation at the apex end of said conical member.

4. A device of the character described comprising a perforated cylindrical member, a cap adapted to seat upon one end of the member, said cap having a reduced and tapered protrusion extending from the outer surface thereof, and a second cap hinged to the protrusion adapted to form a closure therefor.

FRANK B. VAN DE VELDE.